Nov. 5, 1946.  L. P. CROSMAN  2,410,719
BEARING
Original Filed Aug. 7, 1942   2 Sheets-Sheet 2
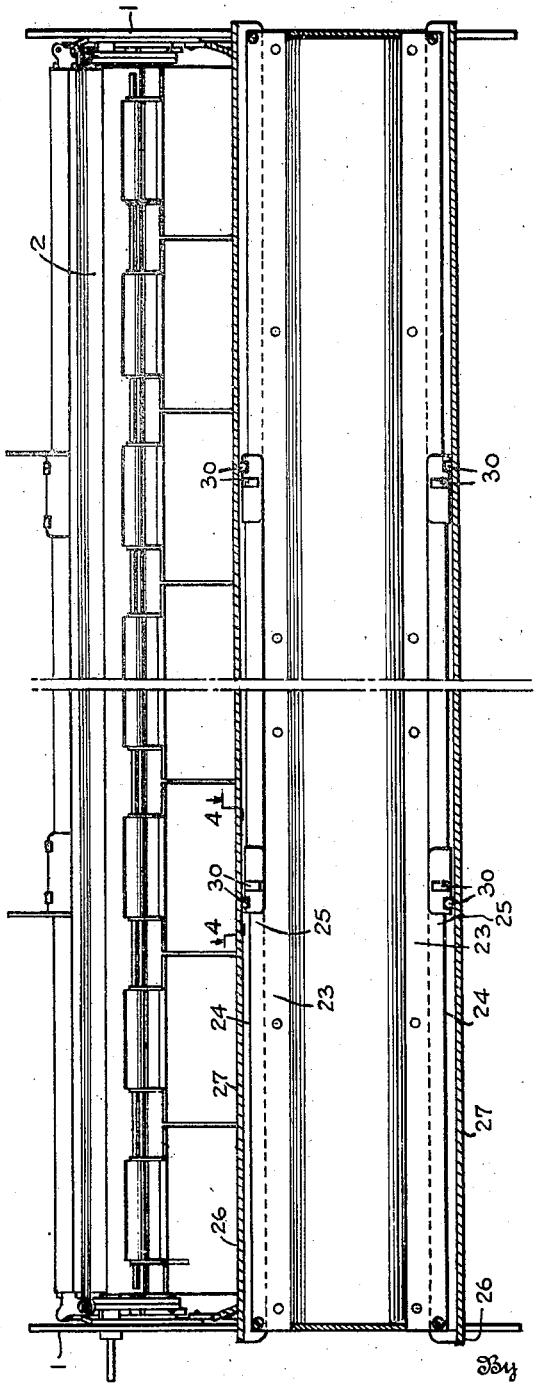
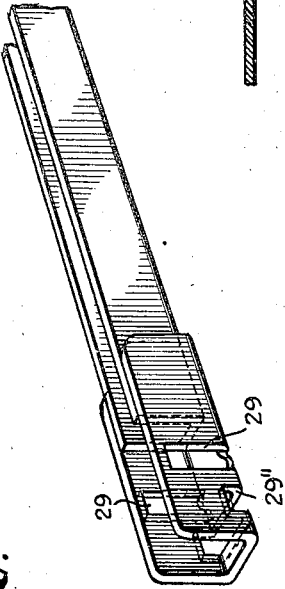
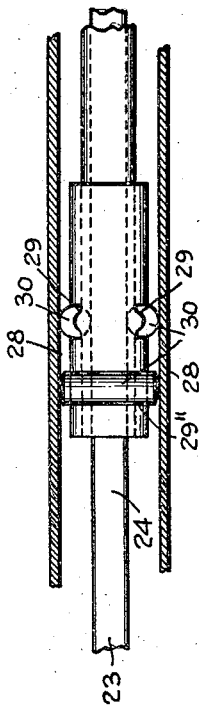
Inventor
LORING P. CROSMAN Patented Nov. 5, 1946

2,410,719

UNITED STATES PATENT OFFICE 2,410,719

BEARING

Loring Pickering Crosman, South Orange, N. J., assignor to Monroe Calculating Machine Company, Orange, N. J., a corporation of Delaware Original application August 7, 1942, Serial No. 454,025. Divided and this application July 19, 1943, Serial No. 495,324

2 Claims. (Cl. 308—6)

The invention relates to bearings and particularly to bearings for the denominationally shiftable platen carriages of listing calculators and the like, an object of the invention being to provide an improved bearing of this description.

The application is a division of the application for patent Serial Number 454,025, filed August 7, 1942, and the invention consists in the novel construction and combinations of parts as hereinafter set forth in the claims.

In the accompanying drawings.

Figure 2 is a section on the line 2—2, Figure 1.

Figure 3 is a detail perspective view of a roller spacer, with the rollers removed, showing the connecting bar partly broken away.

Figure 4 is a detail section on an enlarged scale on the line 4—4, Figure 2.

Figure 1:
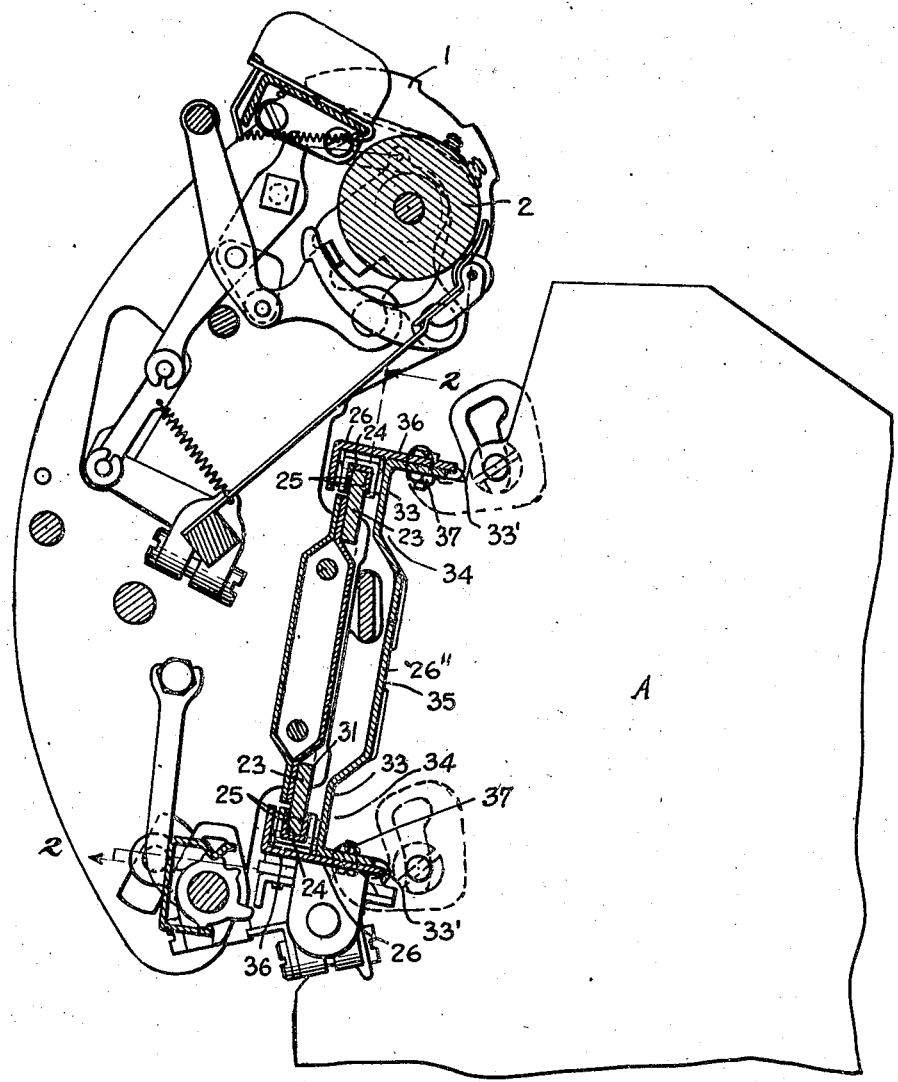
Figure 1 is a transverse vertical section of the invention as applied.

The invention is shown as applied to a Monroe listing calculator, such for instance as disclosed in my Patent No. 1,946,572, dated February 13, 1934, modified in accord with the disclosure of my co-pending application for patent Serial Number 421,803, filed December 5, 1941, upon which patent issued June 29, 1943, No. 2,323,205.

In the drawings, the numeral 1 designates an endwise shiftable carriage, having mounted thereon a rotatable platen 2.

Upper and lower spaced rails 23 of the carriage have opposite upper and lower tracks 24 and each opposite lateral tracks 25, upper and lower spaced channel bars 26 of the stationary main frame having opposite upper and lower tracks 27 and each opposite lateral tracks 28 spaced from those of said rails. Upper and lower anti-friction means are located between said tracks and include each a U-form roller spacer having the arms thereof intersecting at right angles and provided with three slots, two 29 of which are in the parallel arms of said spacer and the other 29" of which is in the cross arm of said spacer; and three anti-friction rollers 30, of generally cylindrical form fitting in said slots, one of said rollers being at right angles to the other two which are parallel. The upper and two lower U-form roller spacers are provided, each couple being connected by a U-form bar the notched roller spacers and their connecting bar all partially embracing the related rail 23.

The upper and lower rails 23 at their inner end portions fit within notches 31 of the carriage frame ends and a flattened tubular brace 32 has bolt connection with said rails to hold the rails securely within the notches. Tie rods 32" connect the carriage frame ends and hold the latter securely against brace 32 to form a rigid unit.

The stationary main frame of the machine has vertical spaced ends A, A, provided each with upper and lower spaced projections 34 and a recess seat between said projections. A horizontal unit comprises the upper and lower spaced U-form channel bars 26, each having the three track-surfaced arms thereof intersecting at right angles, and a member 26" rigidly connected to and forming part of said channel bars, the medium of connection being bolts 37 engaging registering perforations 38 of forwardly bent flanges 33' of member 26" and of rectangular plates 36 of said channel bars. The upper and lower spaced flat rails 23 of the carriage 1 have each the upper and lower parallel track surfaces 24 intersecting the lateral track surfaces 25 thereof at right angles, said channel bars partially embracing said rails and constituting therewith upper and lower pairs of raceway members. The connecting member 26" is provided with upper and lower spaced longitudinal channel seats 33 disposed in general at right angles to the channels of and forming part of the U-form bars 26, said connecting member having a longitudinal channel projection between said seats, said seats fitting over the projections 34 and said projection fitting within the recess seats of the main frame ends A, A, said connecting member 26" having also perforation seats within which fit projections 35 of said main frame ends. Thus the entire bearing including the flat rails 23 thereof may be made of sheet metal, although the endwise shiftable carriage 1 is long and weighty and needs particularly good support. The added feature of the longitudinal channel seats 33 of the connecting member 26" disposed at right angles to the channels of and forming part of the U-form bars 26 further facilitates making the entire bearing of sheet metal. Sheet being inherently resilient, extreme accuracy of manufacture is rendered unnecessary, the weight of the bearing is reduced and manufacture is rendered more economical.

I claim:

1. In a bearing, a horizontal unit comprising upper and lower spaced U-form channel bars having three track-surfaced arms intersecting at right angles and a member connecting and forming part of said bars, upper and lower spaced flat rails mounted upon an endwise shiftable carriage and having each upper and lower parallel track surfaces intersecting the lateral track surfaces thereof at right angles, said channel bars partially embracing said rails and constituting therewith upper and lower pairs of raceway members, and a U-form channeled spacer having the arms thereof intersecting at right angles located in each raceway and partially embracing the related rail, said channeled spacer having three slots in the arms thereof and three cylindrical anti-friction rollers fitting therein and engaging the track surfaces of the related members, two of said rollers being parallel to each other and at right angles to the other one.

2. In a bearing, a horizontal unit comprising upper and lower spaced U-form channel bars having each three track-surfaced arms intersecting at right angles and a member connecting said bars and forming part thereof, upper and lower spaced flat rails mounted upon an endwise shiftable carriage and having each upper and lower parallel track surfaces intersecting lateral track surfaces thereof at right angles, said channel bars partially embracing said rails and constituting therewith upper and lower pairs of raceway members, and a U-form channeled spacer having the arms thereof intersecting at right angles located in each raceway and partially embracing the related rail, said channeled spacer having three slots in the arms thereof and three anti-friction cylindrical rollers fitting in said slots, and engaging the track surfaces of the raceway members, two of said rollers being parallel to each other and at right angles to the other one, said connecting member having upper and lower longitudinal spaced channel seats disposed in general at right angles to the channels of and certain walls of which form part of said U-form bars, said connecting member having a longitudinal channel projection between said seats certain walls of which projection form part of said channel seats.

LORING PICKERING CROSMAN.